United States Patent [19]

Kreuzer et al.

[11] Patent Number: 4,682,410
[45] Date of Patent: Jul. 28, 1987

[54] PROCESS OF MAKING A DYNAMO ELECTRIC MACHINE

[75] Inventors: Helmut Kreuzer; Klaus-Peter Meier, both of Schwieberdingen, Fed. Rep. of Germany

[73] Assignee: Robert Bosch GmbH, Stuttgart, Fed. Rep. of Germany

[21] Appl. No.: 724,799

[22] Filed: Apr. 19, 1985

Related U.S. Application Data

[62] Division of Ser. No. 409,561, Aug. 19, 1982, abandoned.

[30] Foreign Application Priority Data

Nov. 28, 1981 [DE] Fed. Rep. of Germany ....... 3147221

[51] Int. Cl.$^4$ ............................................. H02K 15/02
[52] U.S. Cl. ........................................ 29/596; 29/605
[58] Field of Search ......................... 29/597, 605, 596; 427/104, 213, 185; 310/45, 180, 217

[56] References Cited

U.S. PATENT DOCUMENTS

| | | | |
|---|---|---|---|
| 975,425 | 11/1910 | Hensley | 310/194 |
| 2,714,173 | 7/1955 | Wieseman | 310/194 |
| 2,756,358 | 7/1956 | Johnson | 310/180 |
| 2,913,606 | 11/1959 | Guardiola | 310/194 X |
| 3,145,127 | 8/1964 | Baun | 310/45 X |
| 3,182,383 | 5/1968 | Rosenberg et al. | 310/45 X |
| 3,222,626 | 12/1965 | Feinberg et al. | 310/45 X |
| 3,244,918 | 4/1966 | Pennell et al. | 310/43 |
| 3,333,131 | 7/1967 | Bush et al. | 310/194 |
| 3,877,142 | 4/1975 | Hamano et al. | 310/194 |
| 3,928,779 | 12/1978 | Zwarq et al. | 310/194 |

*Primary Examiner*—Percy W. Echols
*Attorney, Agent, or Firm*—Frishauf, Holtz, Goodman & Woodward

[57] ABSTRACT

The commutating poles of vehicular-type d-c motors, for example for trolley buses or trolley cars, are made by winding, on edge, a copper strip, permitting the wound copper strip to resiliently, spring-like expand so that the individual spiral loops thereof will be slightly spaced from each other, and then exposing the copper strip in a fluidized bed to an insulating powder, for example polyethylene or polyurethane, which is subsequently cured in a hardening or sintering process.

5 Claims, 4 Drawing Figures

PROCESS OF MAKING A DYNAMO ELECTRIC MACHINE

This application is a division of application Ser. No. 409,561, filed Aug. 19, 1982, now abandoned.

The present invention relates to a direct-current dynamo electric machine, and more particularly to a d-c motor suitable as a drive motor for electric road vehicles, such as trolley cars, trolley buses, and the like, and especially to such motors having commutating poles, as well as to the manufacture of making the commutating poll windings.

BACKGROUND

D-C machines, particularly for vehicular use, are described in the book "Electric Machinery" by Dr. Germar Müller, VEB-Verlay (Publishers) Berlin, p. 295, see also FIG. 16.16 thereof. Other publications describe such motors.

THE INVENTION

It is an object to provide a method and a structure for the commutating poles of d-c motors suitable for motive use, particularly street vehicles, and the like, which permits spark-free commutation while requiring but little space.

Briefly, the commutating poles are wound with a strip of conductive material, typically copper, which is essentially rectangular in cross section, the winding being wound on edge, that is, with the narrower side forming the curved portion, and the wider side of the cross-sectional area being planar and located in spiral planes around the axis of the pole. The respective layers or winding turns are insulated from each other by hardened, typically sintered powder applied in a fluidized-bed apparatus.

DRAWINGS

Figure 1:
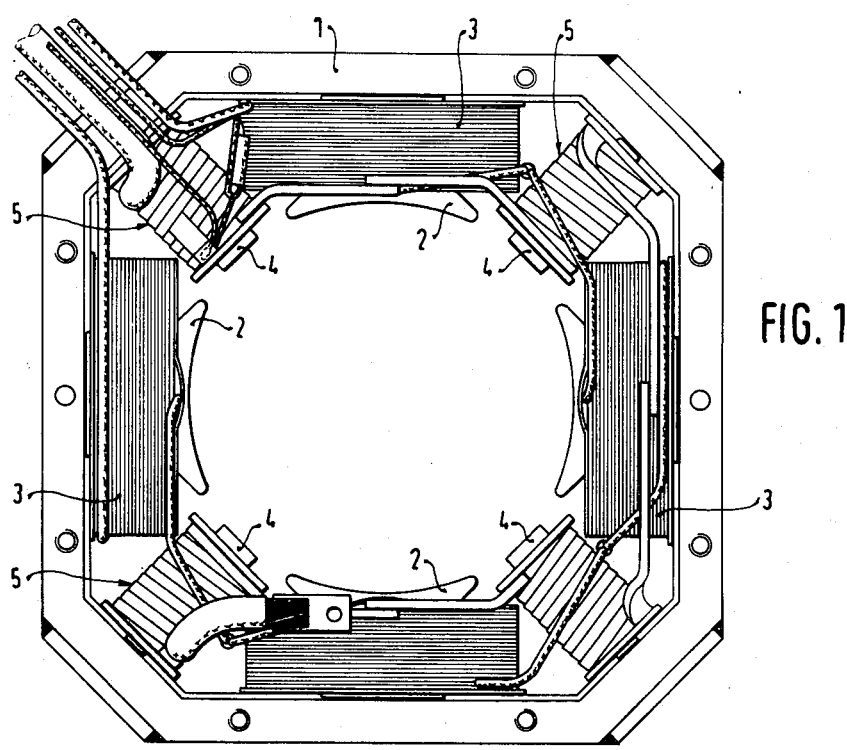
FIG. 1 is an end view of a vehicular-type electric motor having four commutating poles.
Figure 2:
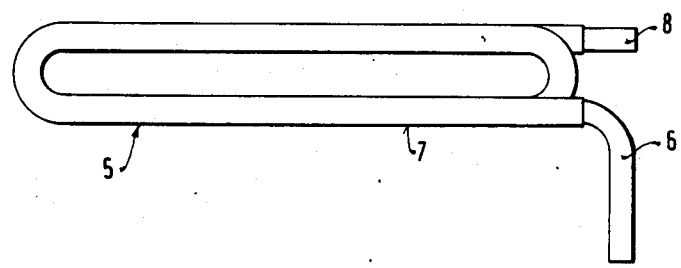
FIG. 2 is a top view of a commutating pole coil.
Figure 3:
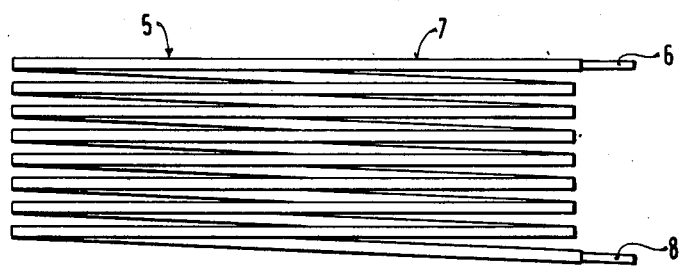
FIG. 3 is a side view, the illustrations of FIGS. 2 and 3 being to an enlarged scale.
Figure 4:
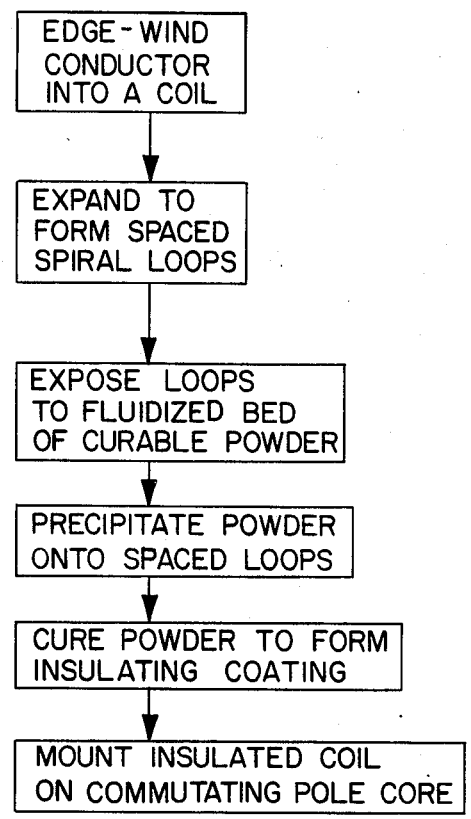
FIG. 4 is a block diagram of the method steps.

The vehicular-type d-c motor has a soft iron armature 1 with four pole shoes 2, each one carrying an exciter winding 3. Four commutating poles 4 are located between the respective main poles 2. Each one of the commutating poles or cores carries a commutating pole winding 5. The commutating pole windings 5 are made of a copper strip 6 which, in cross section, is rectangular. The copper strip 6 is wound on edge, that is, the narrower side of the rectangle forms the curves at the end of the winding, the wider sides of the rectangle forming the top and bottom surfaces of the loops of the windings—see FIGS. 2 and 3. In this specification and claims, this type of winding is referred to as on "edge". The commutating pole windings 5 are so wound that respective winding loops of spirals are slightly spaced from each other. They can be wound tightly but, after having been wound, they will form slightly spaced spirals due to the springiness or resilience of the material, so that the windings will have the configuration, when looked at from the side, as seen in FIG. 3. Initially, the windings are wound with blank or uninsulated copper strip. The respective turns of the windings are insulated from each other by exposing the windings to a fluidized-bed process in which a thin insulating layer 7 of polyethylene, approximately 0.3 mm to 0.4 mm thick, is applied. Any other polymerizable powder which can melt easily can be applied, the powder precipitating on the blank or uninsulated copper of the conductor. After precipitation of the powder on the conductor, it is cured or hardened to form an insulating layer 7 on the individual spirals of coalesced powder.

During the fluidized sintering process, the ends 8 of the copper strip are preferably coated with a covering which prevents precipitation of the sinter powder, the covering later on being stripped off. Thus, the end portions of the windings are left uncoated to provide for ease of electrical connection thereto.

Rather than using polyethylene, polyurthane may also be used. The strip-off coating over the ends 8 of the conductor can be removed after the sintering process.

We claim:

1. Method of making a commutating pole, for use in a vehicular-type dynamo electric machine, comprising the steps of:
   winding a strip of conductor (6), having essentially rectangular cross-sectional configuration, on edge;
   permitting the completed edge-wound winding to resiliently expand to form spaced spiral winding loops having major surfaces facing one another;
   exposing said expanded spaced spiral loops to a fluidized bed in which a powder, comprising a curable, hardenable insulating material, is suspended, said powder precipitating on the conductor forming the winding loops;
   hardening or curing said powder precipitated on the winding loops to form a coalesced insulating coating on each of said facing major surfaces of said spiral winding loops; and
   mounting the thus-insulated edge-wound winding on a commutating pole core (4) of said dynamo electric machine.

2. Method according to claim 1, wherein the conductive strip comprises copper;
   and the powder comprises at least one of the materials of the group consisting of: polyethylene; polyurethane.

3. Method according to claim 1, wherein said hardening and curing step comprises a sintering step.

4. Method according to claim 1, including the step of covering the end portions of the conductor before exposing the wound conductor to the fluidized bed to prevent deposition of insulating powder on the end portions of the conductor;
   and then removing said cover together with any powder which has been precipitated thereon from the conductor to obtain non-insulated end portions.

5. Method according to claim 1, wherein said step of exposing said expanded spaced spiral loop to a fluidized bed comprises exposing said spiral loops to the fluidized bed to precipitate a layer (7) of said powder of between approximately 0.3 to 0.4 mm thickness.

* * * * *